US012595348B2

(12) United States Patent
Poeselt et al.

(10) Patent No.: US 12,595,348 B2
(45) Date of Patent: Apr. 7, 2026

(54) HIGH-STRENGTH eTPU

(71) Applicant: BASF SE, Ludwigshafen am Rhein (DE)

(72) Inventors: Elmar Poeselt, Lemfoerde (DE); Peter Gutmann, Ludwigshafen (DE); Edgar Schander, Lemfoerde (DE); Rebecca Spreen, Lemfoerde (DE); Christiane Martina Dieckmann, Lemfoerde (DE); Dennis Jopp, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 986 days.

(21) Appl. No.: 17/309,829

(22) PCT Filed: Dec. 27, 2019

(86) PCT No.: PCT/EP2019/087076
§ 371 (c)(1),
(2) Date: Jun. 22, 2021

(87) PCT Pub. No.: WO2020/136239
PCT Pub. Date: Jul. 2, 2020

(65) Prior Publication Data
US 2022/0033609 A1 Feb. 3, 2022

(30) Foreign Application Priority Data
Dec. 28, 2018 (EP) ..................................... 18248126

(51) Int. Cl.
| | |
|---|---|
| *C08J 9/18* | (2006.01) |
| *C08G 18/32* | (2006.01) |
| *C08G 18/48* | (2006.01) |
| *C08G 18/66* | (2006.01) |
| *C08J 9/228* | (2006.01) |
| *C08G 101/00* | (2006.01) |

(52) U.S. Cl.
CPC ............ *C08J 9/18* (2013.01); *C08G 18/3206* (2013.01); *C08G 18/4854* (2013.01); *C08G 18/6674* (2013.01); *C08J 9/228* (2013.01); *C08G 2101/00* (2013.01); *C08G 2410/00* (2013.01); *C08J 2375/04* (2013.01)

(58) Field of Classification Search
CPC .............. C08G 18/244; C08G 18/3206; C08G 18/4854; C08G 18/6674; C08G 18/73;

C08G 18/7671; C08G 2101/00; C08G 2410/00; C08J 9/122; C08J 9/18; C08J 9/228; C08J 2203/06; C08J 2207/00; C08J 2375/04
See application file for complete search history.

(56) References Cited

U.S. PATENT DOCUMENTS

| | | | |
|---|---|---|---|
| 6,355,762 B1 * | 3/2002 | Kaufhold ............. | C08G 18/664 |
| | | | 264/211.21 |
| 9,884,947 B2 | 2/2018 | Prissok et al. | |
| 10,005,218 B2 | 6/2018 | Rudolph et al. | |
| 2015/0337102 A1 | 11/2015 | Schiller et al. | |
| 2016/0244584 A1 | 8/2016 | Keppeler | |
| 2018/0251621 A1 | 9/2018 | Prissok et al. | |
| 2019/0345284 A1 | 11/2019 | Gutmann et al. | |

FOREIGN PATENT DOCUMENTS

| | | |
|---|---|---|
| CN | 105273394 | 1/2016 |
| CN | 108559057 | 9/2018 |
| EP | 1 979 401 | 9/2010 |
| EP | 3 053 732 | 8/2016 |
| EP | 2 872 309 | 11/2017 |
| WO | 94/20568 | 9/1994 |
| WO | 2007/082838 | 7/2007 |
| WO | 2010/010010 | 1/2010 |
| WO | 2013/153190 | 10/2013 |
| WO | 2014/150122 | 9/2014 |
| WO | 2014/150124 | 9/2014 |
| WO | 2016/146537 | 9/2016 |
| WO | 2017/030835 | 2/2017 |
| WO | 2018/087362 | 5/2018 |

OTHER PUBLICATIONS

International Preliminary Report on Patentability issued on Mar. 25, 2021 in PCT/EP2019/087076, with English translation, 27 pages.
"Kunststoffhandbuch, Band 7, Polyurethane", Carl Hanser Verlag, 3. Auflage 1993, Kapitel 3.1.
Saechtling, Kunststoff-Taschenbuch, 27th Edition, Hanser Publication House, Munich, 1998, Topic 3.2.1 and 3.2.4, 23 pages.

* cited by examiner

*Primary Examiner* — John M Cooney
(74) *Attorney, Agent, or Firm* — Grüneberg Global IP, PLLC

(57) ABSTRACT
Foamed pellets contain a thermoplastic polyurethane obtainable or obtained by reacting a polyisocyanate composition (IC), containing at least one aliphatic diisocyanate having a number-average molecular weight of less than 200 g/mol, at least one chain extender (CE1), and a polyol composition (PC). A process can be used for the production of such foamed pellets. The foamed pellets can be used for the production of a molded body.

16 Claims, No Drawings

HIGH-STRENGTH eTPU

CROSS-REFERENCE TO RELATED APPLICATIONS

This application is the National Stage entry under § 371 of International Application No. PCT/EP2019/087076, filed on Dec. 27, 2019, and which claims the benefit of European Application No. 18248126.7, filed on Dec. 28, 2018. The content of each of these applications is hereby incorporated by reference in its entirety.

BACKGROUND OF THE INVENTION

Field of the Invention

The present invention relates to foamed pellets comprising a thermoplastic polyurethane obtainable or obtained by reacting a polyisocyanate composition (IC) comprising at least one aliphatic diisocyanate having a number-average molecular weight of less than 200 g/mol, at least one chain extender (CE1), and a polyol composition (PC), and also relates to a process for the production of such foamed pellets. The present invention also encompasses the use of inventive foamed pellets for the production of a molded body.

Description of Related Art

Foamed pellets, which are also referred to as bead foams (or particle foams), and also molded bodies produced from them, based on thermoplastic polyurethane or other elastomers, are known (e.g. WO 94/20568, WO 2007/082838 A1, WO2017030835, WO 2013/153190 A1, WO2010010010) and have manifold possible uses.

Within the meaning of the present invention, "foamed pellets" or else a "bead foam" or "particle foam" refers to a foam in bead form, wherein the average diameter of the beads is from 0.2 to 20 mm, preferably 0.5 to 15 mm and especially from 1 to 12 mm. In the case of non-spherical, e.g. elongate or cylindrical, beads, diameter means the longest dimension.

In principle, there is a need for foamed pellets or bead foams which have improved processability to give the corresponding molded bodies at minimal temperatures while maintaining advantageous mechanical properties. This is especially relevant for the fusion processes currently in widespread use, in which the input of energy for fusing the foamed pellets is introduced by an auxiliary medium, for example steam, since here improved bonding is achieved and damage to the material or foam structure is thus simultaneously reduced and at the same time sufficient bonding or fusion is obtained.

Sufficient bonding or fusion of the foamed pellets is essential in order to obtain advantageous mechanical properties of the molding produced from the foamed pellets. If bonding or fusion of the foam beads is inadequate, their properties cannot be fully utilized, and there is a resultant negative effect on the overall mechanical properties of the molding obtained. Similar considerations apply when the molded body has been weakened. In such cases, the mechanical properties are disadvantageous at the weakened points, the result being the same as mentioned above. The properties of the polymer used therefore have to be efficiently adjustable.

Known materials frequently have a very low modulus of elasticity at room temperature, so that for many applications high densities have to be achieved in order to achieve sufficient stiffness and stability. At the same time, for many applications a high rebound and good mechanical properties are to be achieved and the materials should be readily fusible for the production of moldings from the foamed pellets.

SUMMARY OF THE INVENTION

Within the context of the present invention, "advantageous mechanical properties" are to be interpreted with respect to the intended applications. The most prominent application for the subject matter of the present invention is the application in the shoe sector, where the foamed pellets can be used for molded bodies for constituent parts of the shoe in which damping and/or cushioning is relevant, for example intermediate soles and insoles.

It was therefore an object of the present invention to provide foamed pellets based on polymers which have sufficient stiffness while at the same time having good mechanical properties and good processability. It was a further object of the present invention to provide a process for the production of the corresponding foamed pellets.

According to the invention, this object is achieved by foamed pellets comprising a thermoplastic polyurethane obtainable or obtained by reacting at least the components (i) to (iii):
- (i) a polyisocyanate composition (IC);
- (ii) at least one chain extender (CE1).
- (iii) a polyol composition (PC),
- wherein the isocyanate composition comprises at least one aliphatic diisocyanate having a number-average molecular weight of less than 200 g/mol.

DETAILED DESCRIPTION OF THE INVENTION

It has surprisingly been found that the use of the components used according to the invention and in particular of the specific isocyanate composition (IC) allows foamed pellets to be obtained which have a high modulus of elasticity and at the same time a low softening point, so that the foamed pellets can be readily processed into molded bodies. In addition, the inventive foamed pellets feature good mechanical properties, such as for example high elasticity and good rebound. Surprisingly, a very good phase separation could be achieved according to the invention with at the same time better meltability of the hard phase, so that more rigid and at the same time readily processable foamed pellets were obtained. For instance, the compression hardness in particular could be significantly improved over conventional materials.

Within the context of the present invention, unless otherwise stated, the rebound is determined analogously to DIN 53512, April 2000; the deviation from the standard is the test specimen height which should be 12 mm, but in this test 20 mm is used in order to avoid "penetration through" the sample and measurement of the substrate.

The present invention relates to foamed pellets comprising a thermoplastic polyurethane obtainable or obtained by reacting a polyisocyanate composition (IC), a chain extender (CE1) and a polyol composition (PC). The isocyanate composition (IC) here comprises at least one symmetric diisocyanate having a number-average molecular weight of less than 200 g/mol.

It has surprisingly been found that thermoplastic polyurethanes of this type can be readily processed to give foamed pellets, which in turn can be readily processed to give molded bodies which in particular have a high modulus of elasticity and a very good rebound.

According to the invention, the isocyanate composition (IC) comprises an aliphatic diisocyanate having a number-average molecular weight of less than 200 g/mol. Suitable isocyanates are known per se to those skilled in the art. According to the invention, the isocyanate composition (IC) may also comprise further isocyanates.

Within the context of the present invention, the aliphatic isocyanate is preferably a linear diisocyanate, especially a linear diisocyanate having an even number of carbon atoms. In a further embodiment, the present invention accordingly relates to foamed pellets as described previously, wherein the aliphatic diisocyanate is a linear diisocyanate having an even number of carbon atoms.

Within the context of the present invention, the aliphatic diisocyanate is further preferably isomerically pure.

One suitable aliphatic diisocyanate having a number-average molecular weight of less than 200 g/mol is by way of example hexamethylene diisocyanate (HDI).

In a further embodiment, the present invention accordingly relates to foamed pellets as described previously, wherein the aliphatic diisocyanate is hexamethylene diisocyanate (HDI).

Suitable further isocyanates within the context of the present invention are in particular diisocyanates, in particular aliphatic or aromatic diisocyanates, more preferably aromatic diisocyanates.

In addition, within the context of the present invention, pre-reacted products may be used as isocyanate components, in which some of the OH components are reacted with an isocyanate in a preceding reaction step. The products obtained are reacted with the remaining OH components in a subsequent step, the actual polymer reaction, thus forming the thermoplastic polyurethane.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methyl cyclohexane 2,4-diisocyanate and/or 1-methylcyclohexane 2,6-diisocyanate, methylene dicyclohexyl 4,4'-, 2,4'- and/or 2,2'-diisocyanate (H12MDI).

Suitable aromatic diisocyanates are in particular naphthylene 1,5-diisocyanate (NDI), tolylene 2.4- and/or 2,6-diisocyanate (TDI), 3,3'-dimethyl-4,4'-diisocyanatobiphenyl (TODI), p-phenylene diisocyanate (PDI), diphenylethane 4,4'-diisocyanate (EDI), methylene diphenyl diisocyanate (MDI), where the term MDI is understood to mean diphenylmethane 2,2',2,4'- and/or 4,4'-diisocyanate, dimethyldiphenyl 3,3'-diisocyanate, diphenylethane 1,2-diisocyanate and/or phenylene diisocyanate or H12MDI (methylene dicyclohexyl 4,4'-diisocyanate).

Mixtures can in principle also be used. Examples of mixtures are mixtures comprising at least one further methylene diphenyl diisocyanate besides methylene diphenyl 4,4'-diisocyanate. The term "methylene diphenyl diisocyanate" here means diphenylmethane 2,2'-, 2,4'- and/or 4,4'-diisocyanate or a mixture of two or three isomers. It is therefore possible to use as further isocyanate, for example, diphenylmethane 2,2'- or 2,4'-diisocyanate or a mixture of two or three isomers. In this embodiment, the polyisocyanate composition can also comprise other abovementioned polyisocyanates.

If further isocyanates are used, these are present in the isocyanate composition (IC) preferably at an amount in the range from 0.1% to 20% by weight, further preferably in the range from 0.1% to 10% by weight and particularly preferably at an amount in the range from 0.5% to 5% by weight.

Preferred examples of higher-functionality isocyanates are triisocyanates, for example triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

Organic isocyanates that can be used are aliphatic, cycloaliphatic, araliphatic and/or aromatic isocyanates.

Crosslinkers can additionally also be used, for example the previously mentioned higher-functionality polyisocyanates or polyols, or else other higher-functionality molecules having a plurality of isocyanate-reactive functional groups. It is likewise possible within the context of the present invention to achieve crosslinking of the products through an excess of the isocyanate groups used in proportion to the hydroxyl groups. Examples of higher-functionality isocyanates are triisocyanates, for example triphenylmethane 4,4', 4"-triisocyanate and isocyanurates, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

Here, within the context of the present invention, the amount of crosslinker, that is to say of higher-functionality isocyanates and higher-functionality polyols or higher-functionality chain extenders, is no greater than 3% by weight, preferably less than 1% by weight, further preferably less than 0.5% by weight, based on the total mixture of the components.

The polyisocyanate composition may also comprise one or more solvents. Suitable solvents are known to those skilled in the art. Suitable examples are nonreactive solvents such as ethyl acetate, methyl ethyl ketone and hydrocarbons.

A polyol composition (PC) is used according to the invention. According to the invention, the polyol composition (PC) comprises at least one polyol. Suitable polyols are known in principle to those skilled in the art and described for example in "Kunststoffhandbuch [Plastics Handbook], volume 7, Polyurethane [Polyurethanes]", Carl Hanser Verlag, 3rd edition 1993, chapter 3.1. Particular preference is given to using, as polyol (P1), polyesterols or polyetherols as polyols. It is likewise possible to use polycarbonates. Copolymers may also be used in the context of the present invention. Polyeter polyols are particularly preferred. The number-average molecular weight of the polyols used according to the invention is preferably in the range from 500 to 5000 g/mol, by way of example in the range from 550 g/mol to 2000 g/mol, preferably in the range from 600 g/mol to 1500 g/mol, especially between 650 g/mol and 1000 g/mol.

Polyetherols, but also polyesterols, block copolymers and hybrid polyols such as for example poly(ester/amide), are suitable according to the invention. According to the invention, preferred polyetherols are polyethylene glycols, polypropylene glycols, polyadipates, polycarbonates, polycarbonate diols and polycaprolactone.

In a further embodiment, the present invention accordingly relates to foamed pellets as described previously, wherein the polyol composition comprises a polyol selected from the group consisting of polyetherols, polyesterols, polycaprolactone polyols and polycarbonate polyols.

Suitable polyols are for example those having ether and ester blocks, for example polycaprolactone having polyethylene oxide or polypropylene oxide end blocks, or else polyethers having polycaprolactone end blocks. According to the invention, preferred polyetherols are polyethylene glycols and polypropylene glycols. Polycaprolactone is also preferred.

It is also possible in accordance with the invention to use mixtures of different polyols. The polyols/the polyol composition used preferably have/has an average functionality of between 1.8 and 2.3, preferably between 1.9 and 2.2, in particular 2. The polyols used in accordance with the invention preferably have solely primary hydroxyl groups.

In an embodiment of the present invention, a polyol composition (PC) is used which comprises at least polytetrahydrofuran. According to the invention, the polyol composition may also comprise further polyols in addition to polytetrahydrofuran.

Further polyols that are suitable according to the invention are, for example, polyethers, but also polyesters, block copolymers and also hybrid polyols such as for example poly(ester/amide). Suitable block copolymers are for example those having ether and ester blocks, for example polycaprolactone having polyethylene oxide or polypropylene oxide end blocks, or else polyethers having polycaprolactone end blocks. According to the invention, preferred polyetherols are polyethylene glycols and polypropylene glycols. Polycaprolactone is also preferred as a further polyol.

In a particularly preferred embodiment, the polytetrahydrofuran has a number-average molecular weight $M_n$ in the range from 500 g/mol to 5000 g/mol, further preferably in the range from 550 to 2500 g/mol, particularly preferably in the range from 650 to 2000 g/mol.

Within the context of the present invention, the composition of the polyol composition (PC) can vary within wide ranges. The polyol composition can also comprise mixtures of various polyols.

According to the invention, the polyol composition may also comprise a solvent. Suitable solvents are known per se to those skilled in the art.

When polytetrahydrofuran is used, the number-average molecular weight $M_n$ of the polytetrahydrofuran is preferably in the range from 500 to 5000 g/mol. The number-average molecular weight $M_n$ of the polytetrahydrofuran is further preferably within the range from 500 to 1400 g/mol.

In a further embodiment, the present invention also relates to foamed pellets as described previously, wherein the polyol composition comprises a polyol selected from the group consisting of polytetrahydrofurans having a number-average molecular weight $M_n$ in the range from 500 g/mol to 5000 g/mol.

In a further embodiment, the present invention accordingly relates to foamed pellets as described previously, wherein the polyol composition comprises a polyol selected from the group consisting of polytetrahydrofurans having a number-average molecular weight $M_n$ in the range from 500 g/mol to 2000 g/mol.

Mixtures of various polytetrahydrofurans can also be used in accordance with the invention, that is to say mixtures of polytetrahydrofurans having different molecular weights.

Preferred polyetherols according to the invention are polyethylene glycols, polypropylene glycols and polytetrahydrofurans, and also mixed polyetherols thereof. Mixtures of various polytetrahydrofurans differing in molecular weight may by way of example also be used according to the invention.

According to the invention, at least one chain extender (CE1) is also used. Suitable chain extenders are known per se to those skilled in the art. By way of example, chain extenders are compounds having two groups which are reactive towards isocyanate groups, in particular those having a molecular weight of less than 500 g/mol. Suitable chain extenders are for example diamines or diols. Diols are more preferred according to the invention.

Within the scope of the present invention, mixtures of two or more chain extenders may also be used.

Suitable diols are known in principle to those skilled in the art. According to the invention, the diol preferably has a molecular weight of <500 g/mol. According to the invention, aliphatic, araliphatic, aromatic and/or cycloaliphatic diols having a molecular weight of 50 g/mol to 220 g/mol can be used here as chain extenders, for example. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol.

Suitable chain extenders (CE1) within the context of the present invention are also branched compounds such as 1,4-cyclohexanedimethanol, 2-butyl-2-ethylpropanediol, neopentyl glycol, 2,2,4-trimethylpentane-1,3-diol, pinacol, 2-ethylhexane-1,3-diol or cyclohexane-1,4-diol.

In a further embodiment, the present invention accordingly relates to foamed pellets as described previously, wherein the chain extender (CE1) is selected from the group consisting of propane-1,3-diol, ethane-1,2-diol, butane-1,4-diol, hexane-1,6-diol and HQEE.

The quantitative ratios of the components used are preferably selected here as per step (b) such that a hard segment content in the range from 10% to 40% is obtained.

Unless otherwise stated, the weight-average molecular weights $M_w$ of the thermoplastic block copolymers are determined within the context of the present invention by means of GPC, dissolved in HFIP (hexafluoroisopropanol). The molecular weight is determined using two GPC columns arranged in series (PSS-Gel; 100 A; 5μ; 300*8 mm, Jordi-Gel DVB; mixed bed; 5μ; 250*10 mm; column temperature 60° C.; flow 1 ml/min; RI detector). Calibration is performed here with polymethyl methacrylate (EasyCal; from PSS, Mainz) and HFIP is used as eluent.

In a further aspect, the present invention also relates to a process for the production of foamed pellets. In this case, the present invention relates to a process for the production of foamed pellets comprising the steps of (i) providing a composition (C1) comprising a thermoplastic polyurethane, wherein the thermoplastic polyurethane is obtained or obtainable by reacting at least the components (a) to (c):

(a) a polyisocyanate composition (IC);

(b) at least one chain extender (CE1), (c) a polyol composition (PC), wherein the isocyanate composition comprises at least one aliphatic diisocyanate having a number-average molecular weight of less than 200 g/mol;

(ii) impregnating the composition (C1) with a blowing agent under pressure;

(iii) expanding the composition (C1) by means of pressure decrease.

Within the context of the present invention, the composition (C1) can be used here in the form of a melt or in the form of pellets.

As regards preferred embodiments of the process, suitable feedstocks or mixing ratios, reference is made to the statements above which apply correspondingly.

The inventive process may comprise further steps, for example temperature adjustments.

The unexpanded polymer mixture of the composition (C1) required for the production of the foamed pellets is produced in a known manner from the individual components and also optionally further components such as, by way of example, processing aids, stabilizers, compatibilizers or pigments. Examples of suitable processes are conventional mixing processes with the aid of a kneader, in continuous or batchwise mode, or with the aid of an extruder, for example a co-rotating twin-screw extruder.

In the case of compatibilizers or auxiliaries, such as for example stabilizers, these may also already be incorporated into the components during the production of the latter. The individual components are usually combined before the mixing process, or metered into the apparatus that performs the mixing. In the case of an extruder, the components are all metered into the intake and conveyed together into the extruder, or individual components are added in via a side feed.

The processing takes place at a temperature at which the components are present in a plastified state. The temperature depends on the softening or melting ranges of the components, but must be below the decomposition temperature of each component.

Additives such as pigments or fillers or others of the abovementioned customary auxiliaries are not also melted, but rather incorporated in the solid state.

Further embodiments using well-established methods are also possible here, with the processes used in the production of the starting materials being able to be integrated directly into the production.

For instance, it would for example be possible in the case of the belt process, to introduce the styrene polymer, the impact modifier and also fillers or colorants directly at the end of the belt at which the material is fed into an extruder in order to obtain lenticular granules.

Some of the abovementioned customary auxiliaries can be added to the mixture in this step.

The inventive foamed pellets generally have a bulk density of from 50 g/I to 200 g/l, preferably 60 g/I to 180 g/l, particularly preferably 80 g/I to 150 g/l. The bulk density is measured analogously to DIN ISO 697, where, in contrast to the standard, the determination of the above values involves using a vessel having a 10 l volume instead of a vessel having a 0.5 l volume, since, especially for foam beads having low density and high mass, measurement using only 0.5 l volume is too imprecise.

As stated above, the diameter of the foamed pellets is from 0.5 to 30 mm, preferably 1 to 15 mm and especially from 3 to 12 mm. For non-spherical, for example elongate or cylindrical foamed pellets, diameter means the longest dimension.

The foamed pellets can be produced by the well-established methods known in the prior art by means of (i) providing an inventive composition (C);

(ii) impregnating the composition with a blowing agent under pressure;

(iii) expanding the composition by means of pressure decrease.

The amount of blowing agent is preferably 0.1 to 40 parts by weight, especially 0.5 to 35 parts by weight and particularly preferably 1 to 30 parts by weight, based on 100 parts by weight of the amount used of composition (C).

One embodiment of the abovementioned process comprises (i) providing an inventive composition (C) in the form of pellets;

(ii) impregnating the pellets with a blowing agent under pressure;

(iii) expanding the pellets by means of pressure decrease.

A further embodiment of the abovementioned process comprises a further step:

(i) providing an inventive composition (C) in the form of pellets;

(ii) impregnating the pellets with a blowing agent under pressure;

(iii-a) reducing the pressure to standard pressure without foaming the pellets, optionally by means of prior reduction of the temperature (iii-b) foaming the pellets by means of a temperature increase.

The unexpanded pellets preferably have an average minimal diameter of 0.2-10 mm here (determined via 3D evaluation of the pellets, for example via dynamic image analysis with the use of a PartAn 3D optical measuring apparatus from Microtrac).

The individual pellets generally have an average mass in the range from 0.1 to 50 mg, preferably in the range from 4 to 40 mg and particularly preferably in the range from 7 to 32 mg. This average mass of the pellets (particle weight) is determined as the arithmetic average by means of three weighing operations of in each case 10 pellet particles.

One embodiment of the abovementioned process comprises impregnating the pellets with a blowing agent under pressure and subsequently expanding the pellets in steps (1) and (11):

(I) impregnating the pellets in the presence of a blowing agent under pressure at elevated temperatures in a suitable, closed reaction vessel (e.g. autoclaves)

(II) sudden depressurization without cooling.

The impregnation in step (1) can take place here in the presence of water and optionally suspension auxiliaries, or solely in the presence of the blowing agent and in the absence of water.

Suitable suspension auxiliaries are, for example, water-insoluble inorganic stabilizers, such as tricalcium phosphate, magnesium pyrophosphate, metal carbonates; and also polyvinyl alcohol and surfactants, such as sodium dodecylarylsulfonate. They are typically used in amounts of from 0.05 to 10% by weight, based on the inventive composition.

Depending on the chosen pressure, the impregnation temperatures are in the range from 100° C.-200° C. where the pressure in the reaction vessel is between 2-150 bar, preferably between 5 and 100 bar, particularly preferably between 20 and 60 bar, the impregnation time generally being from 0.5 to 10 hours.

Carrying out the process in suspension is known to those skilled in the art and has been described, by way of example, extensively in WO2007/082838.

When carrying out the process in the absence of the blowing agent, care must be taken to avoid aggregation of the polymer pellets.

Suitable blowing agents for carrying out the process in a suitable closed reaction vessel are by way of example organic liquids and gases which are in a gaseous state under the processing conditions, such as hydrocarbons or inorganic gases or mixtures of organic liquids or gases with inorganic gases, where these may also be combined.

Examples of suitable hydrocarbons are halogenated or non-halogenated, saturated or unsaturated aliphatic hydrocarbons, preferably non-halogenated, saturated or unsaturated aliphatic hydrocarbons.

Preferred organic blowing agents are saturated, aliphatic hydrocarbons, in particular those having 3 to 8 carbon atoms, for example butane or pentane.

Suitable inorganic gases are nitrogen, air, ammonia or carbon dioxide, preferably nitrogen or carbon dioxide, or mixtures of the abovementioned gases.

In a further embodiment, the impregnation of the pellets with a blowing agent under pressure comprises processes and subsequent expansion of the pellets in steps ($\alpha$) and ($\beta$):

($\alpha$) impregnating the pellets in the presence of a blowing agent under pressure at elevated temperatures in an extruder ($\beta$) pelletizing the composition emerging from the extruder under conditions that prevent uncontrolled foaming.

Suitable blowing agents in this process version are volatile organic compounds having a boiling point at standard pressure, 1013 mbar, of −25° C. to 150° C., especially −10° C. to 125° C. Of good suitability are hydrocarbons (preferably halogen-free), especially C4-10-alkanes, for example the isomers of butane, of pentane, of hexane, of heptane and of octane, particularly preferably isobutane. Further possible blowing agents are moreover sterically more demanding compounds such as alcohols, ketones, esters, ethers and organic carbonates.

In this case, the composition is mixed with the blowing agent, which is supplied to the extruder, under pressure in step (ii) in an extruder while melting. The mixture comprising blowing agent is extruded and pelletized under pressure, preferably using counterpressure controlled to a moderate level (an example being underwater pelletization). The melt strand foams in the process, and pelletization gives the foamed pellets.

Carrying out the process via extrusion is known to those skilled in the art and has been described, by way of example, extensively in WO2007/082838, and also in WO 2013/153190 A1.

Extruders that can be used are any of the conventional screw-based machines, in particular single-screw and twin-screw extruders (e.g. ZSK type from Werner & Pfleiderer), co-kneaders. Kombiplast machines, MPC kneading mixers, FCM mixers, KEX kneading screw-extruders and shear-roll extruders, as have been described by way of example in Saechtling (ed.), Kunststoff-Taschenbuch [Plastics Handbook], 27th edition, Hanser-Verlag, Munich 1998, chapters 3.2.1 and 3.2.4. The extruder is usually operated at a temperature at which the composition (C1) is present as a melt, for example at 120° C. to 250° C., in particular 150 to 210° C., and at a pressure, after addition of the blowing agent, of 40 to 200 bar, preferably 60 to 150 bar, particularly preferably 80 to 120 bar, in order to ensure homogenization of the blowing agent with the melt.

The process here can be conducted in an extruder or in an arrangement composed of one or more extruders. Thus, by way of example, the components can be melted and blended, and a blowing agent injected, in a first extruder. In the second extruder, the impregnated melt is homogenized and the temperature and/or the pressure is adjusted. If, by way of example, three extruders are combined with one another, the mixing of the components and the injection of the blowing agent can also be split between two different process sections. If, as is preferred, only one extruder is used, all of the process steps—melting, mixing, injection of the blowing agent, homogenization and adjustment of the temperature and/or of the pressure—are carried out in a single extruder.

As an alternative and in accordance with the methods described in WO 2014/150122 or WO 2014/150124 A1, the corresponding foamed pellets, which are optionally even already colored, can be produced directly from the pellets in that the corresponding pellets are saturated with a supercritical liquid, are removed from the supercritical liquid, followed by (i') immersing the article in a heated fluid or (ii') irradiating the article with energetic radiation (e.g. infrared or microwave irradiation).

Examples of suitable supercritical liquids are those described in WO2014150122 or, e.g. carbon dioxide, nitrogen dioxide, ethane, ethylene, oxygen or nitrogen, preferably carbon dioxide or nitrogen.

The supercritical liquid here can also comprise a polar liquid with Hildebrand solubility parameter equal to or greater than 9 $MPa^{-1/2}$.

The supercritical fluid or the heated fluid may also comprise a colorant here, as a result of which a colored, foamed article is obtained.

The present invention further provides a molded body produced from the inventive foamed pellets.

The corresponding molded bodies can be produced by methods known to those skilled in the art.

A process preferred here for the production of a foam molding comprises the following steps:

(A) introducing the inventive foamed pellets into an appropriate mold;

(B) fusing the inventive foamed pellets from step (i).

The fusing in step (B) is preferably effected in a closed mold, wherein the fusing can be effected by means of steam, hot air (as described for example in EP1979401B1) or energetic radiation (microwaves or radio waves).

The temperature during the fusing of the foamed pellets is preferably below or close to the melting temperature of the polymer from which the bead foam was produced. For the widely used polymers, the temperature for the fusing of the foamed pellets is accordingly between 100° C. and 180° C., preferably between 120 and 150° C.

Temperature profiles/residence times can be ascertained individually here, for example in analogy to the processes described in US20150337102 or EP2872309B1.

The fusion by way of energetic radiation generally takes place in the frequency range of microwaves or radio waves, optionally in the presence of water or of other polar liquids, for example microwave-absorbing hydrocarbons having polar groups (such as for example esters of carboxylic acids and of diols or of triols, or glycols and liquid polyethylene glycols), and can be effected in analogy to the processes described in EP3053732A or WO16146537.

As stated above, the foamed pellets can also comprise colorants. Colorants can be added here in various ways.

In one embodiment, the foamed pellets produced can be colored after production. In this case, the corresponding foamed pellets are contacted with a carrier liquid comprising a colorant, where the carrier liquid (CL) has a polarity that is suitable for sorption of the carrier liquid into the foamed pellets to occur. This can be carried out in analogy to the methods described in the EP application having application Ser. No. 17/198,591.4.

Examples of suitable colorants are inorganic or organic pigments. Examples of suitable natural or synthetic inorganic pigments are carbon black, graphite, titanium oxides, iron oxides, zirconium oxides, cobalt oxide compounds, chromium oxide compounds, copper oxide compounds. Examples of suitable organic pigments are azo pigments and polycyclic pigments.

In a further embodiment, the color can be added during the production of the foamed pellets. By way of example, the colorant can be added into the extruder during the production of the foamed pellets via extrusion.

As an alternative, material that has already been colored can be used as starting material for the production of the foamed pellets, this being extruded—or being expanded in the closed vessel by the processes mentioned above.

In addition, in the process described in WO2014150122, the supercritical liquid or the heated liquid may comprise a colorant.

As stated above, the inventive moldings have advantageous properties for the abovementioned applications in the shoe and sports shoe sector requirement.

In this case, the tensile and compression properties of the molded bodies produced from the foamed pellets are distinguished by the fact that the tensile strength is above 600 kPa (DIN EN ISO 1798. April 2008) and the elongation at break is above 100% (DIN EN ISO 1798, April 2008) and the compressive stress is above 15 kPa at 10% compression (analogous to DIN EN ISO 844, November 2014; the deviation from the standard being that the height of the sample is 20 mm instead of 50 mm and therefore the test speed is adjusted to 2 mm/min).

The rebound resilience of the molded bodies produced from the foamed pellets is above 55% (analogous to DIN 53512, April 2000; the deviation from the standard is the test specimen height which should be 12 mm, but in this test 20 mm is used in order to avoid "penetration through" the sample and measurement of the substrate).

As stated above, there is a relationship between the density and compression properties of the molded bodies produced. The density of the moldings produced is advantageously from 75 to 375 kg/m$^3$, preferably from 100 to 300 kg/m$^3$, particularly preferably from 150 to 200 kg/m$^3$ (DIN EN ISO 845, October 2009).

The ratio of the density of the molding to the bulk density of the inventive foamed pellets here is generally between 1.5 and 2.5, preferably 1.8 to 2.0.

The invention additionally provides for the use of inventive foamed pellets for the production of a molded body for shoe intermediate soles, shoe insoles, shoe combisoles, bicycle saddles, bicycle tires, damping elements, cushioning, mattresses, underlays, grips, protective films, in components in automobile interiors and exteriors, in balls and sports equipment or as floor covering, especially for sports surfaces, track and field surfaces, sports halls, children's playgrounds and pathways.

Preference is given to using inventive foamed pellets for the production of a molded body for shoe intermediate soles, shoe insoles, shoe combisoles or a cushioning element for shoes.

Here, the shoe is preferably an outdoor shoe, sports shoe, sandals, boot or safety shoe, particularly preferably a sports shoe.

The present invention accordingly further also provides a molded body, wherein the molded body is a shoe combisole for shoes, preferably for outdoor shoes, sports shoes, sandals, boots or safety shoes, particularly preferably sports shoes.

The present invention accordingly further also provides a molded body, wherein the molded body is an intermediate sole for shoes, preferably for outdoor shoes, sports shoes, sandals, boots or safety shoes, particularly preferably sports shoes.

The present invention accordingly further also provides a molded body, wherein the molded body is an insole for shoes, preferably for outdoor shoes, sports shoes, sandals, boots or safety shoes, particularly preferably sports shoes.

The present invention accordingly further also provides a molded body, wherein the shaped body is a cushioning element for shoes, preferably for outdoor shoes, sports shoes, sandals, boots or safety shoes, particularly preferably sports shoes.

The cushioning element here can by way of example be used in the heel region or forefoot region.

The present invention therefore also further provides a shoe in which the inventive molded body is used as midsole, intermediate sole or cushioning in, for example, the heel region or forefoot region, wherein the shoe is preferably an outdoor shoe, sports shoe, sandal, boot or safety shoe, particularly preferably a sports shoe.

In a further aspect, the present invention also relates to foamed pellets obtained or obtainable by an inventive process.

The block copolymers used according to the invention typically have a hard phase composed of aromatic polyester and a soft phase. On account of their predetermined block structure, which results from the construction from molecules that are already polymeric per se and therefore long-chained—such as a polytetrahydrofuran building block and a polybutylene terephthalate building block, the block copolymers used according to the invention have a good phase separation between the resilient soft phase and the rigid hard phase. This good phase separation manifests itself in a property which is referred to as high "snapback" but can be characterized only with great difficulty using physical methods and leads to particularly advantageous properties of the inventive foamed pellets.

On account of the good mechanical properties and good temperature behavior, the inventive polymer foams are particularly suitable for the production of molded bodies. Molded bodies can by way of example be produced from the inventive foamed pellets by fusion or bonding.

In a further aspect, the present invention also relates to the use of inventive foamed pellets or of foamed pellets obtained or obtainable by an inventive process for the production of molded bodies. In a further embodiment, the present invention accordingly also relates to the use of inventive foamed pellets, or of foamed pellets obtained or obtainable by an inventive process, for the production of molded bodies, wherein the molded body is produced by means of fusion or bonding of the beads to one another.

The molded bodies obtained according to the invention are suitable, for example, for the production of shoe soles, parts of a shoe sole, bicycle saddles, cushioning, mattresses, underlays, grips, protective films, components in automobile interiors and exteriors, in balls and sports equipment or as floor covering and wall paneling, especially for sports surfaces, track and field surfaces, sports halls, children's playgrounds and pathways.

In a further embodiment, the present invention accordingly also relates to the use of inventive foamed pellets, or of foamed pellets obtained or obtainable by an inventive process, for the production of molded bodies, wherein the molded body is a shoe sole, part of a shoe sole, a bicycle saddle, cushioning, a mattress, underlay, grip, protective film, a component in automobile interiors and exteriors.

In a further aspect, the present invention also relates to the use of the inventive foamed pellets or foamed beads in balls and sports equipment or as floor covering and wall paneling, especially for sports surfaces, track and field surfaces, sports halls, children's playgrounds and pathways.

In a further aspect, the present invention also relates to a hybrid material comprising a matrix composed of a polymer (PM) and foamed pellets according to the present invention.

Materials which comprise foamed pellets and a matrix material are referred to as hybrid materials within the context of the present invention. Here, the matrix material may be composed of a compact material or likewise of a foam.

Polymers (PM) suitable as matrix material are known per se to those skilled in the art. By way of example, ethylene-vinyl acetate copolymers, epoxide-based binders or else polyurethanes are suitable within the context of the present invention. In this case, polyurethane foams or else compact polyurethanes, such as for example thermoplastic polyurethanes, are suitable according to the invention.

According to the invention, the polymer (PM) is chosen here such that there is sufficient adhesion between the foamed pellets and the matrix to obtain a mechanically stable hybrid material.

The matrix may completely or partially surround the foamed pellets here. According to the invention, the hybrid material can comprise further components, by way of example further fillers or also pellets. According to the invention, the hybrid material can also comprise mixtures of different polymers (PM). The hybrid material can also comprise mixtures of foamed pellets.

Foamed pellets that can be used in addition to the foamed pellets according to the present invention are known per se to those skilled in the art. Foamed pellets composed of thermoplastic polyurethanes are particularly suitable within the context of the present invention.

In one embodiment, the present invention accordingly also relates to a hybrid material comprising a matrix composed of a polymer (PM), foamed pellets according to the present invention and further foamed pellets composed of a thermoplastic polyurethane.

Within the context of the present invention, the matrix consists of a polymer (PM).

Examples of suitable matrix materials within the context of the present invention are elastomers or foams, especially foams based on polyurethanes, for example elastomers such as ethylene-vinyl acetate copolymers or else thermoplastic polyurethanes.

The present invention accordingly also relates to a hybrid material as described previously, wherein the polymer (PM) is an elastomer. The present invention additionally relates to a hybrid material as described previously, wherein the polymer (PM) is selected from the group consisting of ethylene-vinyl acetate copolymers and thermoplastic polyurethanes.

In one embodiment, the present invention also relates to a hybrid material comprising a matrix composed of an ethylene-vinyl acetate copolymer and foamed pellets according to the present invention.

In a further embodiment, the present invention relates to a hybrid material comprising a matrix composed of an ethylene-vinyl acetate copolymer, foamed pellets according to the present invention and further foamed pellets composed for example of a thermoplastic polyurethane.

In one embodiment, the present invention relates to a hybrid material comprising a matrix composed of a thermoplastic polyurethane and foamed pellets according to the present invention.

In a further embodiment, the present invention relates to a hybrid material comprising a matrix composed of a thermoplastic polyurethane, foamed pellets according to the present invention and further foamed pellets composed for example of a thermoplastic polyurethane.

Suitable thermoplastic polyurethanes are known per se to those skilled in the art. Suitable thermoplastic polyurethanes are described, for example, in "Kunststoffhandbuch [Plastics Handbook], volume 7, Polyurethane [Polyurethanes]", Carl Hanser Verlag, 3rd edition 1993, chapter 3.

Within the context of the present invention, the polymer (PM) is preferably a polyurethane. "Polyurethane" within the meaning of the invention encompasses all known resilient polyisocyanate polyaddition products. These include, in particular, compact polyisocyanate polyaddition products, such as viscoelastic gels or thermoplastic polyurethanes, and resilient foams based on polyisocyanate polyaddition products, such as flexible foams, semirigid foams or integral foams. Within the meaning of the invention, "polyurethanes" are also understood to mean resilient polymer blends comprising polyurethanes and further polymers, and also foams of these polymer blends. The matrix is preferably a cured, compact polyurethane binder, a resilient polyurethane foam or a viscoelastic gel.

Within the context of the present invention, a "polyurethane binder" is understood here to mean a mixture which consists to an extent of at least 50% by weight, preferably to an extent of at least 80% by weight and especially to an extent of at least 95% by weight, of a prepolymer having isocyanate groups, referred to hereinafter as isocyanate prepolymer. The viscosity of the polyurethane binder according to the invention is preferably in a range here from 500 to 4000 mPa·s, particularly preferably from 1000 to 3000 mPa·s, measured at 25° C. according to DIN 53 018.

In the context of the invention, "polyurethane foams" are understood to mean foams according to DIN 7726.

The density of the matrix material is preferably in the range from 1.2 to 0.01 g/cm³. The matrix material particularly preferably is a resilient foam or an integral foam having a density in the range from 0.8 to 0.1 g/cm³, especially from 0.6 to 0.3 g/cm³, or a compact material, for example a cured polyurethane binder.

Foams are particularly suitable matrix materials. Hybrid materials comprising a matrix material composed of a polyurethane foam preferably exhibit good adhesion between the matrix material and foamed pellets.

In one embodiment, the present invention also relates to a hybrid material comprising a matrix composed of a polyurethane foam and foamed pellets according to the present invention.

In a further embodiment, the present invention relates to a hybrid material comprising a matrix composed of a polyurethane foam, foamed pellets according to the present invention and further foamed pellets composed for example of a thermoplastic polyurethane.

In one embodiment, the present invention relates to a hybrid material comprising a matrix composed of a polyurethane integral foam and foamed pellets according to the present invention.

In a further embodiment, the present invention relates to a hybrid material comprising a matrix composed of a polyurethane integral foam, foamed pellets according to the present invention and further foamed pellets composed for example of a thermoplastic polyurethane.

An inventive hybrid material, comprising a polymer (PM) as matrix and inventive foamed pellets, can by way of example be produced by mixing the components used to produce the polymer (PM) and the foamed pellets optionally with further components, and reacting them to give the hybrid material, where the reaction is preferably effected under conditions under which the foamed pellets are essentially stable.

Suitable processes and reaction conditions for producing the polymer (PM), in particular an ethylene-vinyl acetate copolymer or a polyurethane, are known per se to those skilled in the art.

In a preferred embodiment, the inventive hybrid materials are integral foams, especially integral foams based on polyurethanes. Suitable processes for producing integral foams are known per se to those skilled in the art. The integral foams are preferably produced by the one-shot process using the low-pressure or high-pressure technique in closed, advantageously temperature-controlled molds. The molds are preferably made of metal, for example aluminum or steel. These procedures are described for example by Piechota and Rohr in "Integralschaumstoff" [Integral Foam], Carl-Hanser-Verlag, Munich, Vienna, 1975, or in "Kunststoff-Handbuch" [Plastics Handbook], volume 7, "Polyurethane" [Polyurethanes], 3rd edition, 1993, chapter 7.

If the inventive hybrid material comprises an integral foam, the amount of the reaction mixture introduced into the mold is set such that the molded bodies obtained and composed of integral foams have a density of 0.08 to 0.70 g/cm$^3$, especially of 0.12 to 0.60 g/cm$^3$. The degrees of compaction for producing the molded bodies having a compacted surface zone and cellular core are in the range from 1.1 to 8.5, preferably from 2.1 to 7.0.

It is therefore possible to produce hybrid materials having a matrix composed of a polymer (PM) and the inventive foamed pellets contained therein, in which there is a homogeneous distribution of the foamed beads. The inventive foamed pellets can be easily used in a process for the production of a hybrid material since the individual beads are free-flowing on account of their low size and do not place any special requirements on the processing.

Techniques for homogeneously distributing the foamed pellets, such as slow rotation of the mold, can be used here.

Further auxiliaries and/or additives may optionally also be added to the reaction mixture for producing the inventive hybrid materials. Mention may be made by way of example of surface-active substances, foam stabilizers, cell regulators, release agents, fillers, dyes, pigments, hydrolysis stabilizers, odor-absorbing substances and fungistatic and bacteriostatic substances.

Examples of surface-active substances that can be used are compounds which serve to support homogenization of the starting materials and which optionally are also suitable for regulating the cell structure. Mention may be made by way of example of emulsifiers, for example the sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, turkey red oil and peanut oil, and cell regulators, for example paraffins, fatty alcohols and dimethylpolysiloxanes. Oligomeric acrylates having polyoxyalkylene and fluoroalkane radicals as pendant groups are also suitable for improving the emulsifying action, cell structure and/or stabilization of the foam.

Suitable release agents for example include: reaction products of fatty acid esters with polyisocyanates, salts of amino group-comprising polysiloxanes and fatty acids, salts of saturated or unsaturated (cyclo)aliphatic carboxylic acids having at least 8 carbon atoms and tertiary amines, and also in particular internal release agents, such as carboxylic esters and/or carboxylic amides, produced by esterification or amidation of a mixture of montanic acid and at least one aliphatic carboxylic acid having at least 10 carbon atoms with at least difunctional alkanolamines, polyols and/or polyamines having molecular weights of 60 to 400, mixtures of organic amines, metal salts of stearic acid and organic mono- and/or dicarboxylic acids or anhydrides thereof or mixtures of an imino compound, the metal salt of a carboxylic acid and optionally a carboxylic acid.

Fillers, in particular reinforcing fillers, are understood to mean the customary organic and inorganic fillers, reinforcers, weighting agents, agents for improving abrasion behavior in paints, coating compositions etc., these being known per se. Specific examples which may be mentioned are: inorganic fillers such as siliceous minerals, for example sheet silicates such as antigorite, bentonite, serpentine, hornblendes, amphiboles, chrysotile, talc; metal oxides such as kaolin, aluminum oxides, titanium oxides, zinc oxide and iron oxides, metal salts such as chalk, barite and inorganic pigments such as cadmium sulfide, zinc sulfide and also glass and the like. Preference is given to using kaolin (china clay), aluminum silicate and coprecipitates of barium sulfate and aluminum silicate and also natural and synthetic fibrous minerals such as wollastonite, metal fibers and in particular glass fibers of various lengths, which may optionally have been sized. Examples of organic fillers that can be used are: carbon black, melamine, colophony, cyclopentadienyl resins and graft polymers, and also cellulose fibers, polyamide fibers, polyacrylonitrile fibers, polyurethane fibers, polyester fibers based on aromatic and/or aliphatic dicarboxylic esters, and in particular carbon fibers.

The inorganic and organic fillers can be used individually or as mixtures.

In an inventive hybrid material, the volume proportion of the foamed pellets is preferably 20 percent by volume or more, particularly preferably 50 percent by volume and more preferably 80 percent by volume or more and especially 90 percent by volume or more, in each case based on the volume of the inventive hybrid system.

The inventive hybrid materials, in particular hybrid materials having a matrix composed of cellular polyurethane, feature very good adhesion of the matrix material to the inventive foamed pellets. As a result, there is preferably no tearing of an inventive hybrid material at the interface between matrix material and foamed pellets. This makes it possible to produce hybrid materials which compared to conventional polymer materials, in particular conventional polyurethane materials, for a given density have improved mechanical properties, such as tear propagation resistance and elasticity.

The elasticity of inventive hybrid materials in the form of integral foams is preferably greater than 40% and particularly preferably greater than 50% according to DIN 53512.

The inventive hybrid materials, especially those based on integral foams, additionally exhibit high rebound resiliences at low density. Integral foams based on inventive hybrid materials are therefore outstandingly suitable in particular as materials for shoe soles. Light and comfortable soles with good durability properties are obtained as a result. Such materials are especially suitable as intermediate soles for sports shoes.

The inventive hybrid materials having a cellular matrix are suitable, for example, for cushioning, for example of furniture, and mattresses.

Hybrid materials having a matrix composed of a viscoelastic gel especially feature increased viscoelasticity and improved resilient properties. These materials are thus likewise suitable as cushioning materials, by way of example for seats, especially saddles such as bicycle saddles or motorcycle saddles.

Hybrid materials having a compact matrix are by way of example suitable as floor coverings, especially as covering for playgrounds, track and field surfaces, sports fields and sports halls.

The properties of the inventive hybrid materials can vary within wide ranges depending on the polymer (PM) used and in particular can be varied within wide limits by variation of size, shape and nature of the expanded pellets, or else by addition of further additives, for example also additional non-foamed pellets such as plastics pellets, for example rubber pellets.

The inventive hybrid materials have a high durability and toughness, which is made apparent in particular by a high tensile strength and elongation at break. In addition, inventive hybrid materials have a low density.

Further embodiments of the present invention can be found in the examples. It will be appreciated that the features of the subject matter/processes/uses according to the invention that are mentioned above and elucidated below are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but these do not restrict the present invention. In particular, the present invention also encompasses those embodiments which result from the dependency references and hence combinations specified hereinafter.

1. Foamed pellets comprising a thermoplastic polyurethane obtainable or obtained by reacting at least the components (i) to (iii):
   (i) a polyisocyanate composition (IC);
   (ii) at least one chain extender (CE1),
   (iii) a polyol composition (PC),
   wherein the isocyanate composition comprises at least one aliphatic diisocyanate having a number-average molecular weight of less than 200 g/mol.
2. Foamed pellets according to embodiment 2, wherein the aliphatic diisocyanate is a linear diisocyanate having an even number of carbon atoms.
3. Foamed pellets according to embodiment 1 or 2, wherein the aliphatic diisocyanate is hexamethylene diisocyanate (HDI).

4. Foamed pellets according to any of embodiments 1 to 3, wherein the chain extender (CE1) is selected from the group consisting of propane-1,3-diol, ethane-1,2-diol, butane-1,4-diol, hexane-1,6-diol and HQEE.
5. Foamed pellets according to any of embodiments 1 to 4, wherein the polyol composition comprises a polyol selected from the group consisting of polyetherols, polyesterols, polycaprolactone polyols and polycarbonate polyols.
6. Foamed pellets according to any of embodiments 1 to 5, wherein the polyol composition comprises a polyol selected from the group consisting of polytetrahydrofurans having a number-average molecular weight Mn in the range from 500 g/mol to 2000 g/mol.
7. A process for the production of foamed pellets comprising the steps of
   (i) providing a composition (C1) comprising a thermoplastic polyurethane, wherein the thermoplastic polyurethane is obtained or obtainable by reacting at least the components (a) to (c):
      (a) a polyisocyanate composition (IC);
      (b) at least one chain extender (CE1),
      (c) a polyol composition (PC),
   wherein the isocyanate composition comprises at least one aliphatic diisocyanate having a number-average molecular weight of less than 200 g/mol;
   (ii) impregnating the composition (C1) with a blowing agent under pressure;
   (iii) expanding the composition (C1) by means of pressure decrease.
8. The process according to embodiment 2, wherein the aliphatic diisocyanate is a linear diisocyanate having an even number of carbon atoms.
9. The process according to embodiment 1 or 2, wherein the aliphatic diisocyanate is hexamethylene diisocyanate (HDI).
10. The process according to any of embodiments 1 to 3, wherein the chain extender (CE1) is selected from the group consisting of propane-1,3-diol, ethane-1,2-diol, butane-1,4-diol, hexane-1,6-diol and HQEE.
11. The process according to any of embodiments 1 to 4, wherein the polyol composition comprises a polyol selected from the group consisting of polyetherols, polyesterols, polycaprolactone polyols and polycarbonate polyols.
12. The process according to any of embodiments 1 to 5, wherein the polyol composition comprises a polyol selected from the group consisting of polytetrahydrofurans having a number-average molecular weight Mn in the range from 500 g/mol to 2000 g/mol.
13. Foamed pellets obtained or obtainable by a process according to any of embodiments 7 to 12.
14. The use of foamed pellets according to any of embodiments 1 to 6 or 13 for the production of a molded body.
15. The use according to embodiment 14, wherein the molded body is produced by means of fusion or bonding of the beads to one another.
16. The use according to embodiment 14 or 15, wherein the molded body is a shoe sole, part of a shoe sole, a bicycle saddle, cushioning, a mattress, underlay, grip, protective film, a component in automobile interiors and exteriors.
17. The use of foamed pellets according to any of embodiments 1 to 6 or 13 in balls and sports equipment or as floor covering and wall paneling, especially for sports surfaces, track and field surfaces, sports halls, children's playgrounds and pathways.

18. A hybrid material comprising a matrix composed of a polymer (PM) and foamed pellets according to any of embodiments 1 to 6 or 13 or foamed pellets obtainable or obtained by a process according to any of embodiments 7 to 12.

19. The hybrid material according to embodiment 18, wherein the polymer (PM) is an EVA.

20. The hybrid material according to embodiment 18, wherein the polymer (PM) is a thermoplastic polyurethane.

21. The hybrid material according to embodiment 18, wherein the polymer (PM) is a polyurethane foam.

22. The hybrid material according to embodiment 18, wherein the polymer (PM) is a polyurethane integral foam.

The following examples serve to illustrate the invention, but are in no way restrictive in respect of the subject matter of the present invention.

EXAMPLES

1. The Following Feedstocks were Used:

Polyol 1: polyether polyol having an OH number of 112.2 and exclusively primary OH groups (based on tetramethylene oxide, functionality: 2)

Chain extender 1: butane-1,4-diol

Isocyanate 1: aliphatic isocyanate (hexamethylene 1,6-diisocyanate)

Isocyanate 2: aromatic isocyanate (methylene diphenyl 4,4'-diisocyanate)

Catalyst 1: tin(II) dioctoate (50% in DOA)

Catalyst 2: tin (II) dioctoate (10% in DOA)

Antioxidant 1: sterically hindered phenol

Antioxidant 2: sterically hindered phenol

TPU crosslinker 1: Thermoplastic polyurethane having an NCO content of 8.5% and a functionality of 2.05 by means of addition of oligomeric MDI 2. Production of the TPU The following examples TPU 1 to 4, specified hereafter, were produced in a ZSK58 MC twin-screw extruder from Coperion, having a processing length of 48D (12 barrels). The melt was discharged from the extruder by means of a gear pump. After filtration of the melt, the polymer melt was processed by means of underwater pelletization into pellets which were dried continuously at 40-90° C. in a heated fluidized bed.

The polyol, the chain extender and the diisocyanate and also any catalyst were metered into the first zone. The supply of further additives, as described above, is effected in zone 8.

The barrel temperatures are in the range from 150–230° C. The discharge of the melt and underwater pelletization are effected at melt temperatures of 210-230° C. The screw speed is between 180 and 240 $min^{-1}$. The throughput is in the range from 180-220 kg/h.

The amounts used are summarized in table 1.

TABLE 1

| Synthesis examples: | | | | |
| --- | --- | --- | --- | --- |
| | TPU1 | TPU2 | TPU3 | TPU4 |
| Polyol 1 [parts] | 100 | 100 | 100 | 100 |
| Chain extender 1 [parts] | 11.49 | 31.96 | 16.20 | 20.88 |
| Isocyanat 1 [parts] | 38.48 | 76.21 | | |
| Isocyanat 2 [parts] | | | 70.00 | 83.00 |
| Catalyst 1 [mL/min] | | 0.25 | | |

TABLE 1-continued

| Synthesis examples: | | | | |
| --- | --- | --- | --- | --- |
| | TPU1 | TPU2 | TPU3 | TPU4 |
| Catalyst 2 [mL/min] | 0.5 | | 0.16 | 0.16 |
| Antioxidant 1 [parts] | 1.66 | 1.66 | | |
| Antioxidant 2 [parts] | | | 1.88 | 2.06 |

3. Production of the eTPU 3.1 The expanded beads made of the thermoplastic polyurethanes (table 1) were produced using a twin-screw extruder having a screw diameter of 44 mm and a length-to-diameter ratio of 42 with connected melt pump, a start-up valve with screen changer, a die plate and an underwater pelletization system. The thermoplastic polyurethane was dried prior to processing at 80° C. for 3 h in order to obtain a residual moisture content of less than 0.02% by weight. In addition to the thermoplastic polyurethane, a TPU which had been admixed with diphenylmethane 4,4'-diisocyanate having an average functionality of 2.05 in a separate extrusion process, was added.

The respectively used thermoplastic polyurethane and also the TPU crosslinker 1 were each metered into the intake of the twin-screw extruder separately via gravimetric metering devices.

After metering the materials into the intake of the twin-screw extruder, they were melted and mixed. The blowing agents $CO_2$ and $N_2$ were subsequently added via one injector each. The remaining extruder length was used for the homogeneous incorporation of the blowing agents into the polymer melt. After the extruder, the polymer/blowing agent mixture was forced using a gear pump (GP) via a start-up valve with screen changer (SV) into a die plate (DP), and divided in the die plate into strands which were cut into pellets in the pressurized cutting chamber, through which a temperature-controlled liquid flowed, of the underwater pelletization system (UWP), and transported away with the water and expanded in the process.

A centrifugal dryer was used to ensure separation of the expanded beads from the process water.

The total throughput of the extruder, polymers and blowing agents, was 40 kg/h. Table 2 lists the amounts used of the polymers and of the blowing agents. Here, the polymers always constitute 100 parts, while the blowing agents are counted in addition, so that total compositions above 100 parts are obtained.

TABLE 2

| Parts of the polymers and blowing agents metered, where the polymers/solids always result in 100 parts and the blowing agents are counted in addition | | | | | |
| --- | --- | --- | --- | --- | --- |
| Name | TPU used | Amount of the TPU used [parts] | Amount of the functionalized TPU [parts] | Amount of CO2 [parts] | Amount of N2 [parts] |
| eTPU | TPU 1 | 99.1 | 0.9 | 2.1 | 0.2 |
| eTPU 2 | TPU 1 | 99.1 | 0.9 | 2.1 | 0.2 |

The temperatures used for the extruder and downstream devices and also the pressure in the cutting chamber of the UWP are listed in table 3.

TABLE 3

| | Temperature range in the extruder (° C.) | Temperature range of the GP (° C.) | Temperature range of the SV (° C.) | Temperature range of the DP (° C.) | Water pressure in the UWP (bar) | Water temperature in the UWP (° C.). |
|---|---|---|---|---|---|---|
| eTPU1 | 210-240 | 200 | 200 | 220 | 15 | 45 |
| eTPU2 | 210-240 | 200 | 200 | 220 | 15 | 45 |

Temperature data of the installation components

After separation of the expanded pellets from the water by means of a centrifugal dryer, the expanded pellets are dried at 60° C. for 3 h in order to remove the remaining surface water and any possible moisture present in the bead and not to distort further analysis of the beads.

Table 4 lists the bulk densities resulting for the individual expanded thermoplastic polyurethanes after the drying.

TABLE 4

Data regarding the eTPU

| | Bulk density (g/l) |
|---|---|
| eTPU1 | 162 |
| eTPU2 | 160 |

3.2 In addition to the processing in the extruder, expanded beads were also produced in an impregnation tank. For this purpose, the tank was filled to a filling level of 80% with the solid/liquid phase, with the phase ratio being 0.32.

The solid phase can be seen here to be the TPU1 or the TPU2 and the liquid phase can be seen to be the mixture of water with calcium carbonate and a surface-active substance. The blowing agent (butane) was injected into the gas-tight tank, which had previously been purged with nitrogen, onto this mixture at the amount indicated in table 5 based on the solid phase (TPU1 or TPU 2). The tank was heated while stirring the solid/liquid phase and nitrogen was injected in a defined manner up to a pressure of 8 bar at a temperature of 50° C. Heating was subsequently continued up to the desired impregnation temperature (IMT). When the impregnation temperature and the impregnation pressure had been reached, the tank was depressurized after a given holding time via a valve. The precise production parameters of the experiments and also the bulk densities achieved are listed in table 5.

TABLE 5

Production parameters and bulk densities achieved for the impregnated materials TPU 1 and TPU 2

| Name | TPU | Blowing agent concentration based on the amount of solid phase (% by weight) | Holding time (range of IMT −5° C. to IMT +2° C.) (min) | IMT (° C.) | Bulk density (g/l) |
|---|---|---|---|---|---|
| eTPU3 | TPU1 | 24 | 5.4 | 112 | 127 |
| eTPU4 | TPU1 | 24 | 5.6 | 112.5 | 97 |
| eTPU5 | TPU1 | 24 | 5.2 | 114 | 72 |
| eTPU6 | TPU2 | 24 | 3.8 | 133 | 132 |
| eTPU7 | TPU2 | 24 | 3.9 | 134 | 95 |
| eTPU8 | TPU2 | 24 | 4.1 | 135 | 69 |

4. Fusion and Mechanical Properties 4.1 Production of Molded Bodies by Steam Fusion The expanded pellets were subsequently fused to give square slabs having a side N length of 200 mm and a thickness of 10 mm or 20 mm by contacting with steam in a molding machine from Kurtz ersa GmbH (Energy Foamer). For the thickness of the slabs, the fusion parameters only differ with respect to the cooling. The fusion parameters for the different materials were selected such that the slab side of the final molding that faced the movable side (MII) of the mold had a minimum number of collapsed eTPU beads. Gap steaming was optionally also effected through the movable side of the mold. Regardless of the experiment, a cooling time of 120 s for a slab thickness of 20 mm and 100 s for a slab of thickness 10 mm from the fixed side (MI) and the movable side of the mold was always established at the end. Table 6 lists the respective steaming conditions as vapor pressures. The slabs are stored in an oven at 70° C. for 4 hours.

TABLE 6

Steaming conditions (vapor pressures)

| | Gap steaming | | Cross-steaming | |
|---|---|---|---|---|
| Name | Pressure [bar] MI | Pressure [bar] MII | Pressure [bar] MI | Pressure [bar] MII |
| eTPU1 | 0.5 | 0.7 | 1.3 | 0 |
| eTPU2 | 0.5 | 0.7 | 1.3 | 0 |

TABLE 7

Mechanical properties

| | | Sample | | | |
|---|---|---|---|---|---|
| Sample ref. | | eTPU 1 10 mm | eTPU 1 20 mm | eTPU 2 10 mm | eTPU 2 20 mm |
| Foam density | [g/cm³] | 0.313 | 0.272 | 0.317 | 0.272 |
| Tear propagation resistance (trouser test piece) | [N/mm] | 11.4 | | 12.4 | |
| Dimensional stability test | Change in length [%] | −0.7 | −0.7 | −0.6 | −0.8 |
| | Change in height [%] | 27.7 | 28.4 | 28.1 | 23.3 |
| Tensile test | Tensile strength [MPa] | 2.17 | | 2.15 | |
| | Elongation at tensile strength [%] | 148 | | 149 | |
| | Elongation at tensile strength (traverse) [%] | 205 | | 203 | |
| | Foam density [g/cm³] | 0.308 | | 0.314 | |

23

TABLE 7-continued

Mechanical properties

| Sample ref. | | eTPU 1 10 mm | eTPU 1 20 mm | eTPU 2 10 mm | eTPU 2 20 mm |
|---|---|---|---|---|---|
| Compressive strength | Compressive strength 10 [kPa] | | 56 | | 42 |
| | Compressive strength 50 [kPa] | | 509 | | 495 |
| | Foam density [g/cm³] | | 0.263 | | 0.26 |
| Tear propagation resistance (split tear) | [N/mm] | | 5.3 | | 4.7 |
| Rebound resilience | [%] | | 77 | | 77 |

4.2 Comparative Experiments Rebound Resilience

In order to highlight the better rebound resilience of the described material, two TPUs (TPU3 and TPU4), which have a hard phase of MDI but have identical Shore hardnesses as the TPU 1 and the TPU 2, were likewise foamed in an impregnation process as described above.

For this purpose, the tank was filled to a filling level of 80% with the solid/liquid phase, with the phase ratio being 0.32.

The solid phase can be seen here to be the TPU3 or the TPU4 and the liquid phase can be seen to be the mixture of water with calcium carbonate and a surface-active substance. The blowing agent (butane) was injected into the gas-tight tank, which had previously been purged with nitrogen, onto this mixture at the amount indicated in table 8 based on the solid phase (TPU3 or TPU4). The tank was heated while stirring the solid/liquid phase and nitrogen was injected in a defined manner up to a pressure of 8 bar at a temperature of 50° C. Heating was subsequently continued up to the desired impregnation temperature (IMT). When the impregnation temperature and the impregnation pressure had been reached, the tank was depressurized after a given holding time via a valve.

TABLE 8

Production parameters and bulk densities achieved for the impregnated materials

| Name | TPU | Blowing agent concentration based on the amount of solid phase (% by weight) | Holding time (range of IMT −5° C. to IMT +2° C.) (min) | IMT (° C.) | Bulk density (g/l) |
|---|---|---|---|---|---|
| Comp. eTPU1 | TPU3 | 24 | 6.3 | 140 | 80 |
| Comp. eTPU2 | TPU4 | 24 | 4.5 | 156 | 71 |

The expanded pellets were subsequently fused to give square slabs having a side length of 200 mm and a thickness of 20 mm by contacting with steam in a molding machine from Kurtz ersa GmbH (Energy Foamer). The fusion parameters for the different materials were selected such that the slab side of the final molding that faced the movable side (MII) of the mold had a minimum number of collapsed eTPU beads. Regardless of the experiment, a cooling time of 40 s from the fixed side (MI) and the movable side of the mold was always established at the end. Table 9 lists the respective steaming conditions. The slabs are subsequently stored in an oven at 70° C. for 4 hours.

TABLE 9

Fusion parameters

| | Cross steam | | | Autoclave steam | | |
|---|---|---|---|---|---|---|
| Name | Time [s] | Pressure MI [bar] | Pressure MII [bar] | Time [s] | Pressure MI [bar] | Pressure MII [bar] |
| Comp. eTPU1 | 3 | 3.2 | 3.2 | 48 | 3.2 | 3.2 |
| Comp. eTPU2 | 3 | 3.6 | 3.6 | 48 | 3.6 | 3.6 |
| eTPU5 | 7 | 0.8 | 0.8 | 32 | 1.0 | 1.0 |
| eTPU8 | 7 | 1.6 | 1.6 | 32 | 1.6 | 1.6 |

The rebound resilience was subsequently determined for all samples according to DIN EN ISO 8307:2008-03 (table 10)

TABLE 10

Mechanical analysis

| Name | Foam density DIN EN ISO 845 [g/cm³] | Rebound DIN EN ISO 8307 [%] |
|---|---|---|
| Comp. eTPU1 | 0.197 | 52.6 |
| Comp. eTPU2 | 0.163 | 36.5 |
| eTPU5 | 0.188 | 69.8 |
| eTPU8 | 0.154 | 70.6 |

5. Measurement Methods:

Measurement methods that can be used for the material characterization include the following: DSC. DMA, TMA, NMR, FT-IR, GPC Mechanical properties (eTPU)

| | |
|---|---|
| Foam density | DIN EN ISO 845: 2009 October |
| Tear propagation resistance | DIN EN ISO 8067: 2009 June |
| Dimensional stability test | ISO 2796: 1986 August |
| Tensile test | ASTM D5035: 2011 |
| Rebound resilience | DIN 53512: 2000 April (Table 7) |
| | DIN EN ISO 8307: 2008 March (Table 10) |

CITED LITERATURE

WO 94/20568 A1
WO 2007/082838 A1
WO 2017/030835 A1
WO 2013/153190 A1
WO 2010/010010
"Kunststoffhandbuch Band 7, Polyurethane" [Plastics Handbook, volume 7, Polyurethanes], Carl Hanser Verlag, 3rd edition, 1993, chapter 3.1.
WO 2007/082838 A1
WO 2013/153190 A1
Saechtling (Ed.), Kunststoff-Taschenbuch [Plastics Handbook], 27th edition, Hanser-Verlag, Munich 1998, chapters 3.2.1 and 3.2.4
WO 2014/150122 A1
WO 2014/150124 A1
EP 1 979 401B1
US 2015/0337102 A1
EP 2 872 309B1

EP 3 053 732 A1

WO 2016/146537 A1

The invention claimed is:

1. Foamed pellets, comprising a thermoplastic polyurethane obtainable or obtained by reacting at least components (i) to (iii):

(i) a polyisocyanate composition (IC), (ii) at least one chain extender (CE1), and (iii) a polyol composition (PC), wherein the polyisocyanate composition (IC) comprises at least hexamethylene diisocyanate, and, if the polyisocyanate composition (IC) comprises further isocyanates, the further isocyanates are present in the polyisocyanate composition (IC) at an amount in the range from 0.1% to 20% by weight, the chain extender (CE1) is at least one selected from the group consisting of propane-1,3-diol, ethane-1,2-diol, butane-1,4-diol, hexane-1,6-diol, and hydroquinone bis (2-hydroxyethyl) ether, an average diameter of beads of the foamed pellets is from 0.2 to 20 mm, and the rebound resilience of a 20 mm test sample prepared from the foamed pellets is at least 55% according to DIN 53512.

2. The foamed pellets according to claim 1, wherein the polyol composition (PC) comprises at least one polyol selected from the group consisting of a polyetherol, a polyesterol, a polycaprolactone polyol, and a polycarbonate polyol.

3. The foamed pellets according to claim 1, wherein the polyol composition (PC) comprises at least one polyol selected from the group consisting of a polytetrahydrofuran having a number-average molecular weight Mn in the range from 500 g/mol to 2000 g/mol.

4. A process for the production of the foamed pellets according to claim 1, comprising:

i) providing a composition (C1) comprising a thermoplastic polyurethane, wherein the thermoplastic polyurethane is obtained or obtainable by reacting at least components (a) to (c):

(a) a polyisocyanate composition (IC), (b) at least one chain extender (CE1), and (c) a polyol composition (PC), wherein the polyisocyanate composition (IC) comprises at least hexamethylene diisocyanate, and, if the polyisocyanate composition (IC) comprises further isocyanates, the further isocyanates are present in the polyisocyanate composition (IC) at an amount in the range from 0.1% to 20% by weight, the chain extender (CE1) at least one selected from the group consisting of propane-1,3-diol, ethane-1,2-diol, butane-1,4-diol, hexane-1,6-diol, and hydroquinone bis (2-hydroxyethyl) ether; and (ii) impregnating the composition (C1) with a blowing agent under pressure; and (iii) expanding the composition (C1) by a pressure decrease, wherein an average diameter of beads of the foamed pellets is from 0.2 to 20 mm.

5. Foamed pellets, obtained or obtainable by a process according to claim 4.

6. A molded body, comprising the foamed pellets according to claim 5.

7. A method of producing the molded body according to claim 6, the method comprising:

fusing or bonding the foamed pellets to one another.

8. The molded body according to claim 6, wherein the molded body is a shoe sole, a part of a shoe sole, a bicycle saddle, a cushioning, a mattress, an underlay, a grip, a protective film, or a component in automobile interiors and exteriors.

9. The foamed pellets according to claim 5, wherein the foamed pellets are molded into a ball, sports equipment, a floor covering, or a wall paneling.

10. A hybrid material, comprising a matrix composed of a polymer (PM) and the foamed pellets according to claim 5.

11. A molded body, comprising the foamed pellets according to claim 1.

12. A method of producing the molded body according to claim 11, the method comprising:

fusing or bonding the foamed pellets to one another.

13. The molded body according to claim 11, wherein the molded body is a shoe sole, a part of a shoe sole, a bicycle saddle, a cushioning, a mattress, an underlay, a grip, a protective film, or a component in automobile interiors and exteriors.

14. The foamed pellets according to claim 1, wherein the foamed pellets are molded into a ball, sports equipment, a floor covering, or a wall paneling.

15. A hybrid material, comprising a matrix composed of a polymer (PM) and the foamed pellets according to claim 1.

16. The foamed pellets according to claim 1, wherein a number average molecular weight of said polyols is in a range of from 550 g/mol to 2,000 g/mol.

\*    \*    \*    \*    \*